United States Patent
Tsironis

(10) Patent No.: US 8,912,861 B1
(45) Date of Patent: Dec. 16, 2014

(54) MECHANICALLY CONTROLLED VARIABLE CAPACITORS FOR IMPEDANCE TUNERS

(71) Applicant: Christos Tsironis, Kirkland (CA)

(72) Inventor: Christos Tsironis, Kirkland (CA)

( * ) Notice: Subject to any disclaimer, the term of this patent is extended or adjusted under 35 U.S.C. 154(b) by 38 days.

(21) Appl. No.: 13/783,792

(22) Filed: Mar. 4, 2013

(51) Int. Cl.
*H03H 7/38* (2006.01)
*H01G 5/06* (2006.01)
*H03H 7/40* (2006.01)

(52) U.S. Cl.
CPC . *H03H 7/40* (2013.01); *H01G 5/06* (2013.01); *H03H 7/38* (2013.01)
USPC ............................... 333/32; 333/17.3; 334/78

(58) Field of Classification Search
USPC .................. 333/32, 17.3, 263; 334/78, 81–83
See application file for complete search history.

(56) References Cited

U.S. PATENT DOCUMENTS

| | | | | | |
|---|---|---|---|---|---|
| 2,723,348 | A | * | 11/1955 | Dreyer, Jr. | 334/45 |
| 4,025,882 | A | * | 5/1977 | Takeo | 334/45 |
| 7,224,241 | B2 | * | 5/2007 | Jue | 333/32 |
| 7,646,267 | B1 | | 1/2010 | Tsironis | |

* cited by examiner

*Primary Examiner* — Stephen Jones

(57) ABSTRACT

An improved grounding technique for mechanically adjustable rotary capacitors uses a directly grounded bronze sliding contact to effectively and continuously ground the rotating comb-like blades of the capacitor. RF measurements of the continuity and repeatability of the capacitance settings prove the suitability of the modified capacitors for using in pre-calibrated multi-capacitor MHz range impedance tuners.

8 Claims, 17 Drawing Sheets

Concept of grounding a rotary blade capacitor in intermediate state

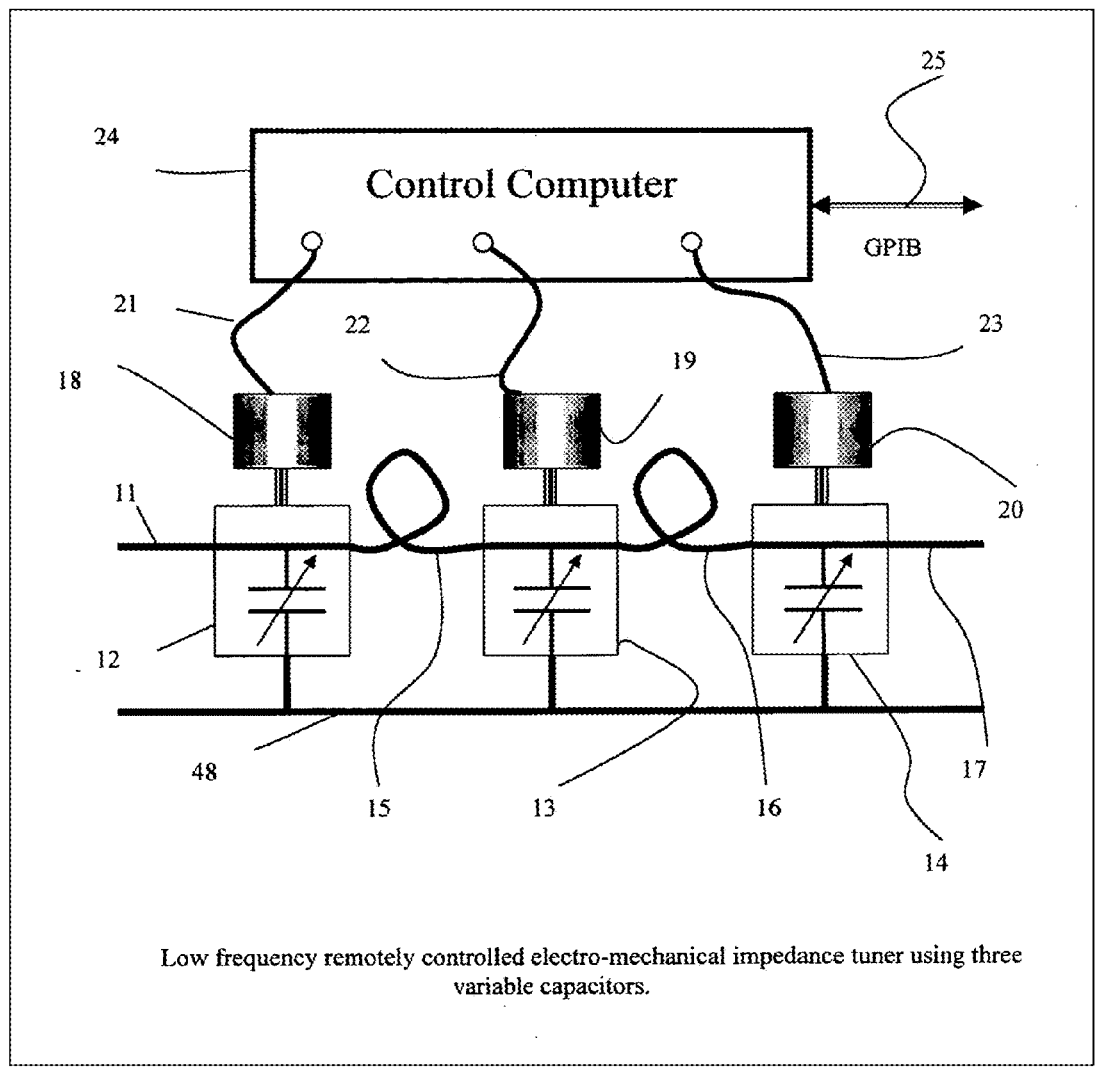
Figure 1 (prior art): Impedance tuner using three adjustable shunt capacitors

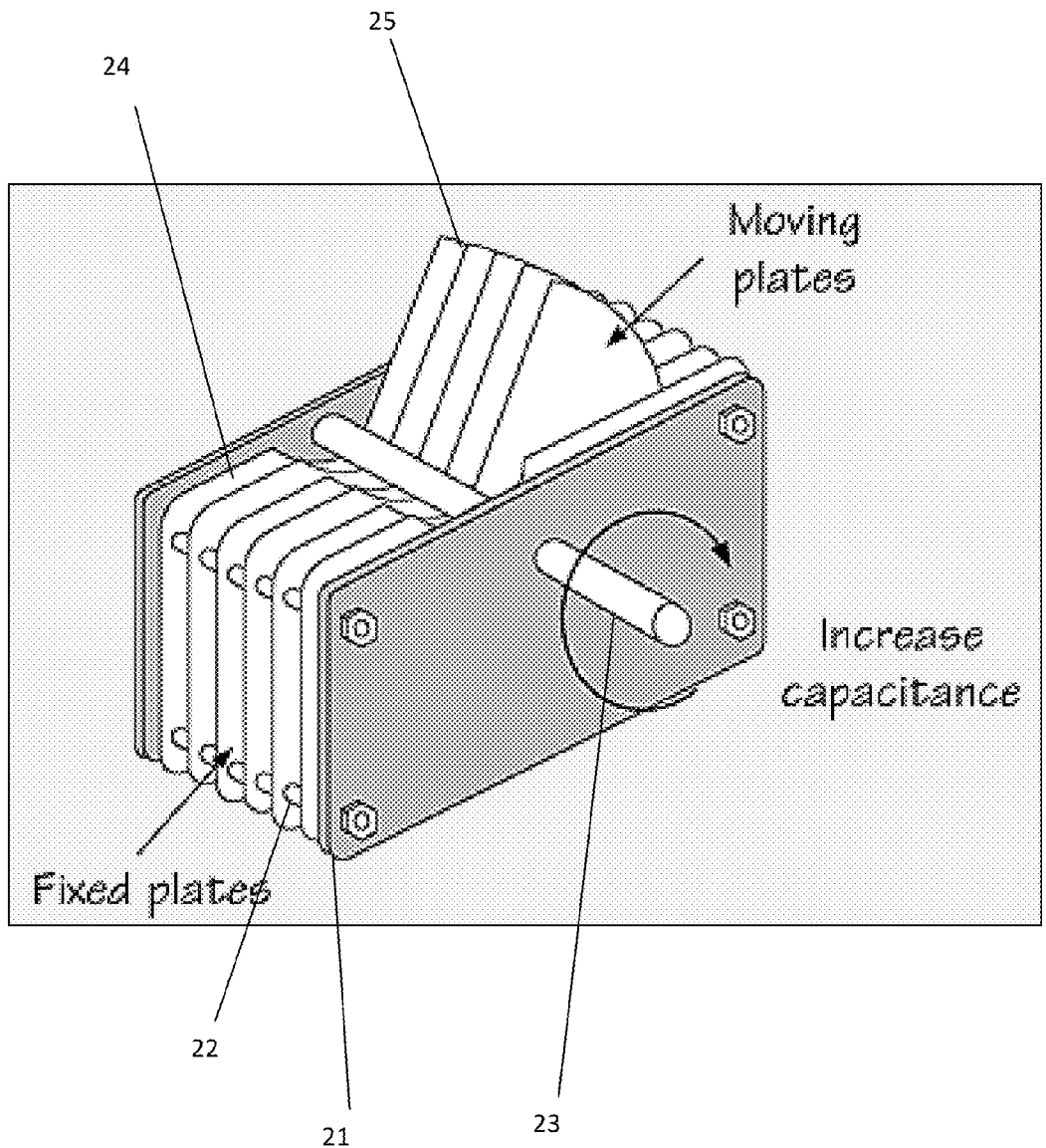
Figure 2 (prior art): rotary blade variable capacitor

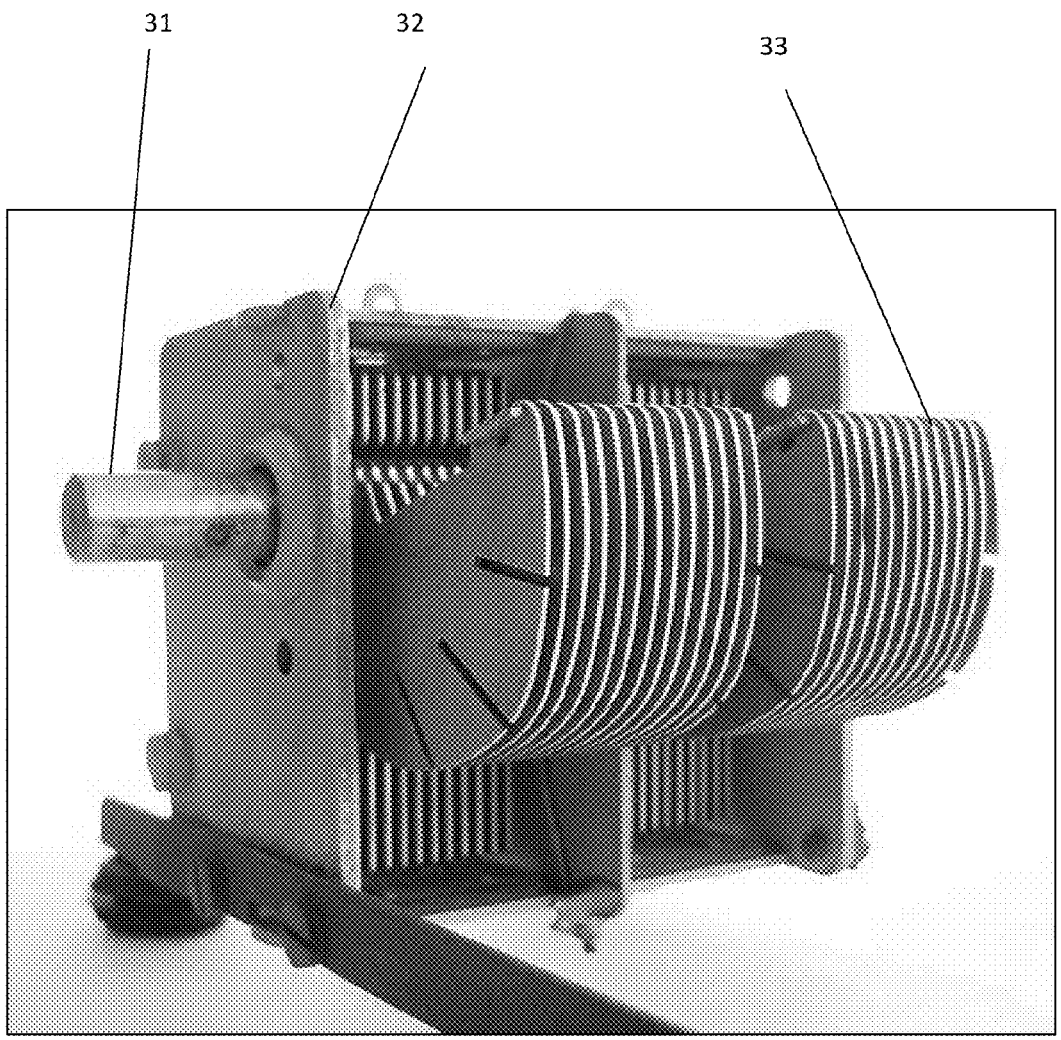
Figure 3 (prior art): rotary blade variable capacitor

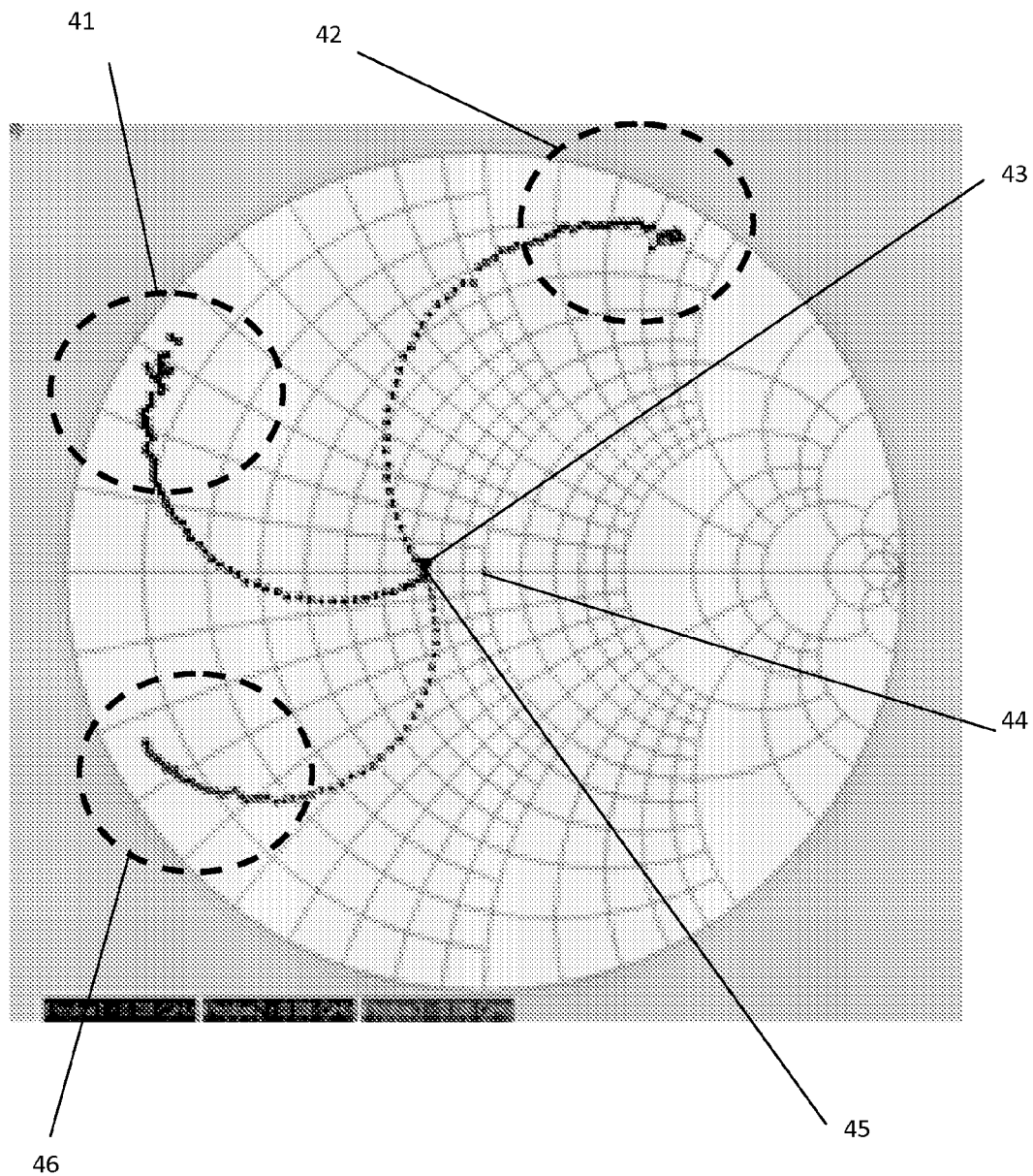
Figure 4: Reflection factor of 3 capacitor tuner using rotary capacitors "as-is"

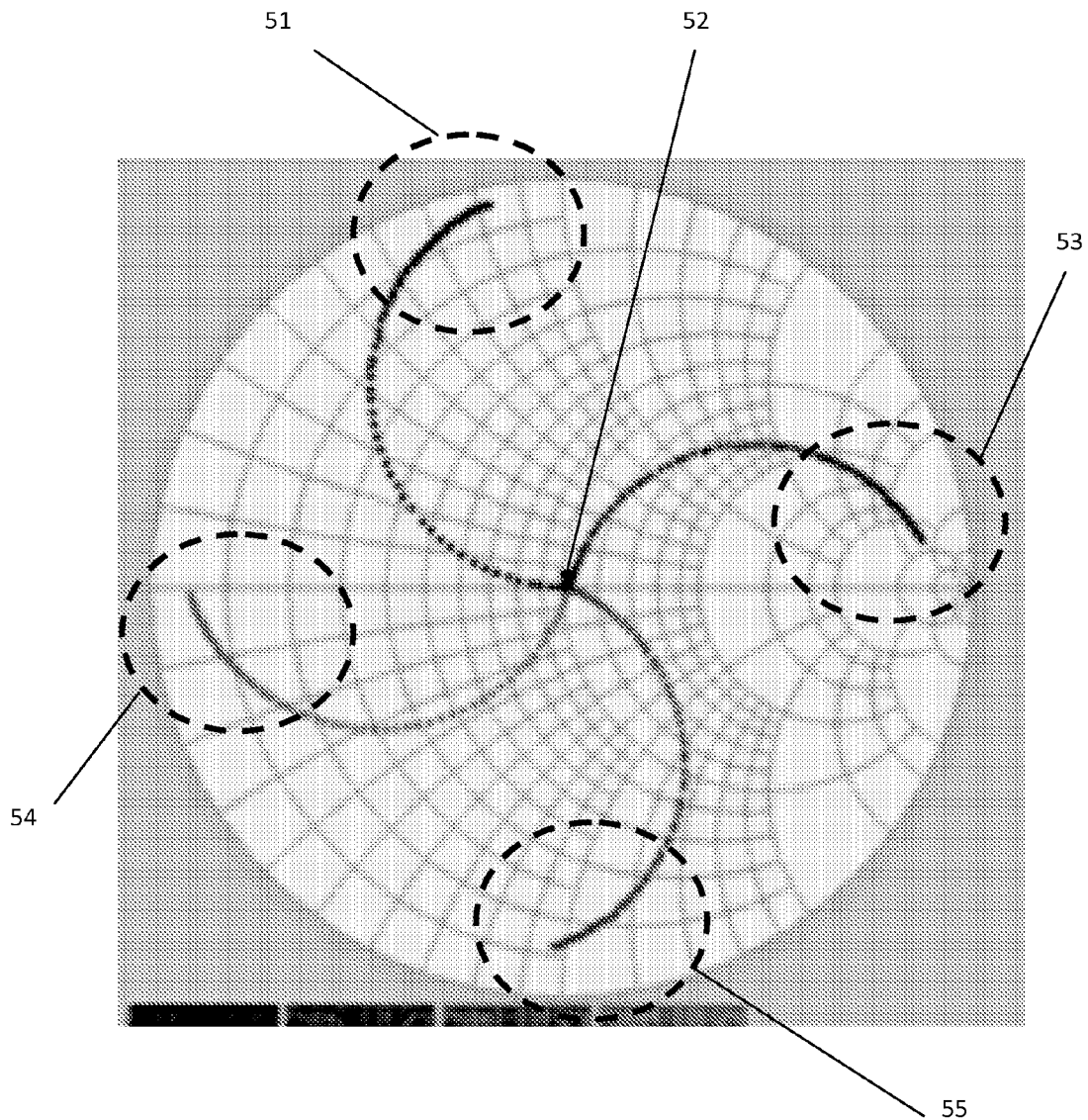
Figure 5: Reflection factor of 4 capacitor tuner using "grounded" rotary capacitors

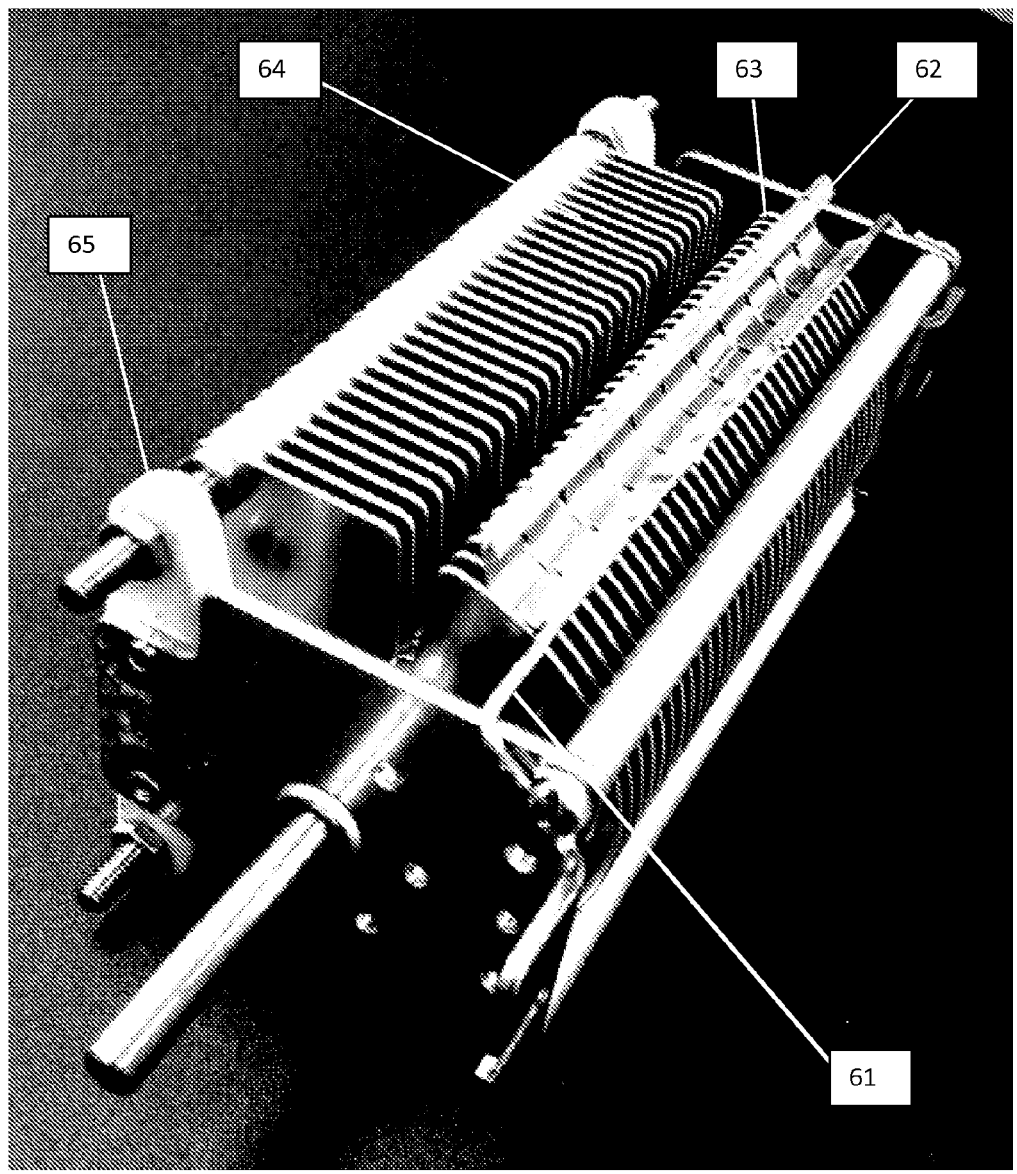
Figure 6: Grounding a rotary blade capacitor

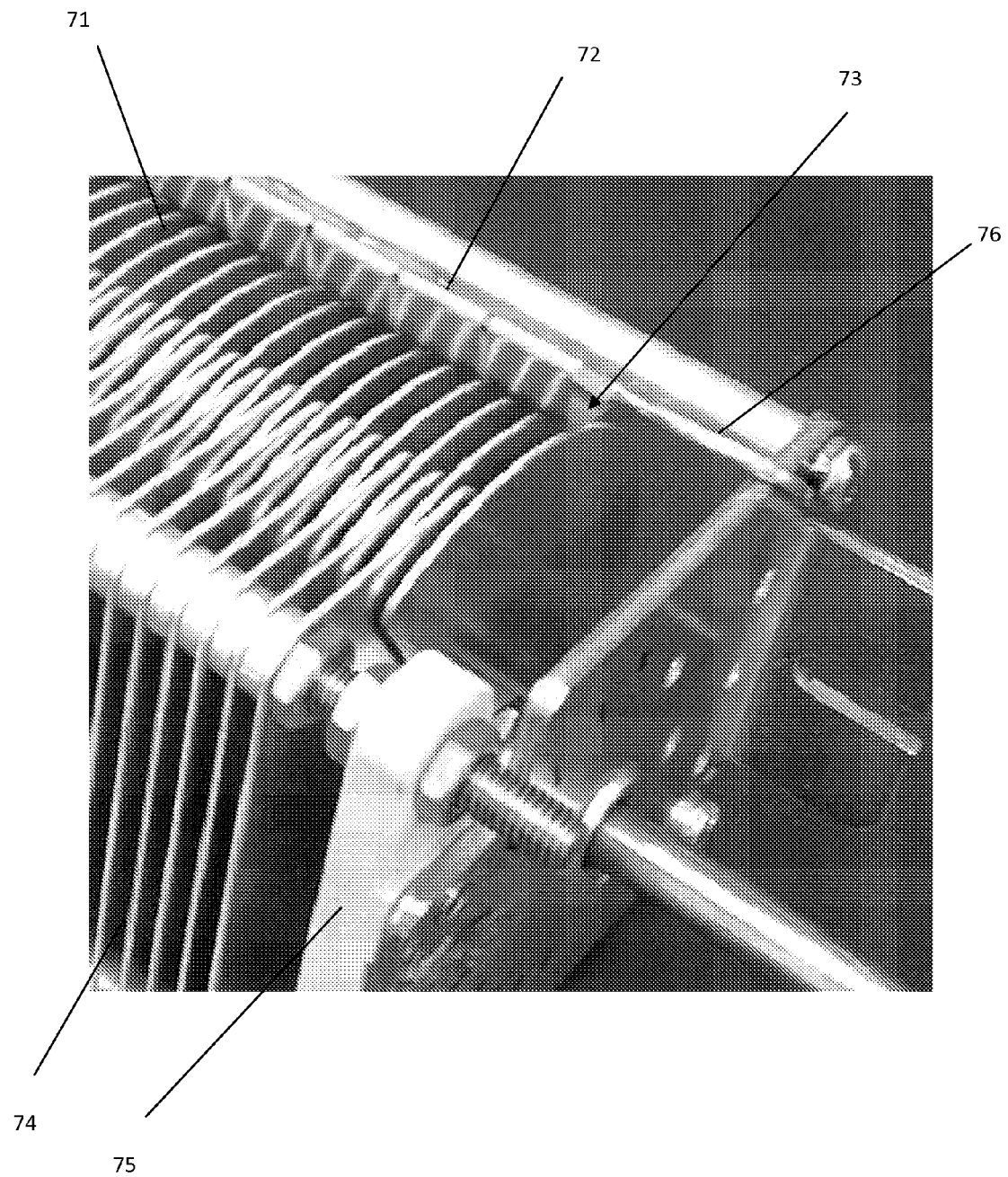
Figure 7: Grounding a rotary blade capacitor (detail)

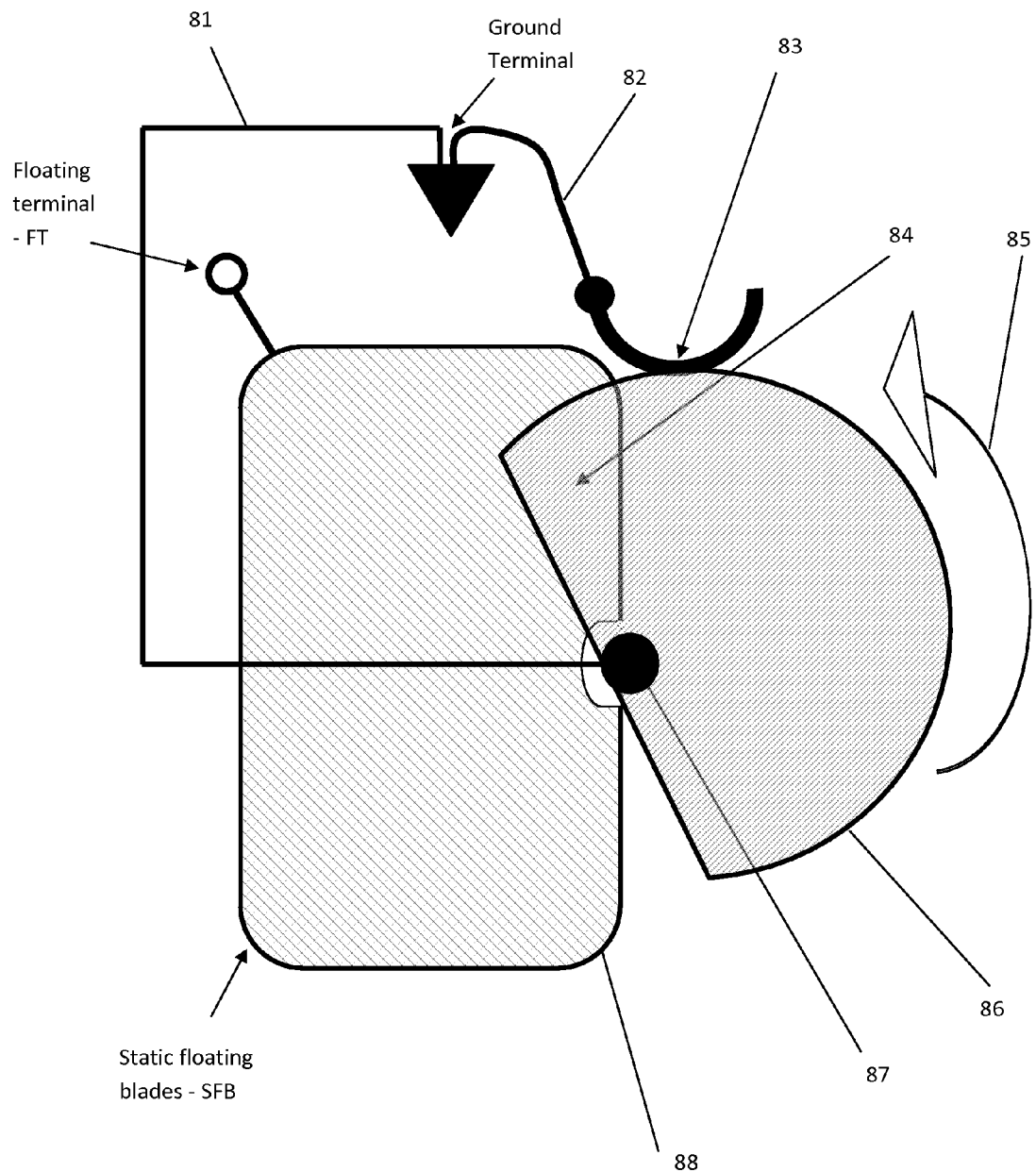
Figure 8: Concept of grounding a rotary blade capacitor in intermediate state

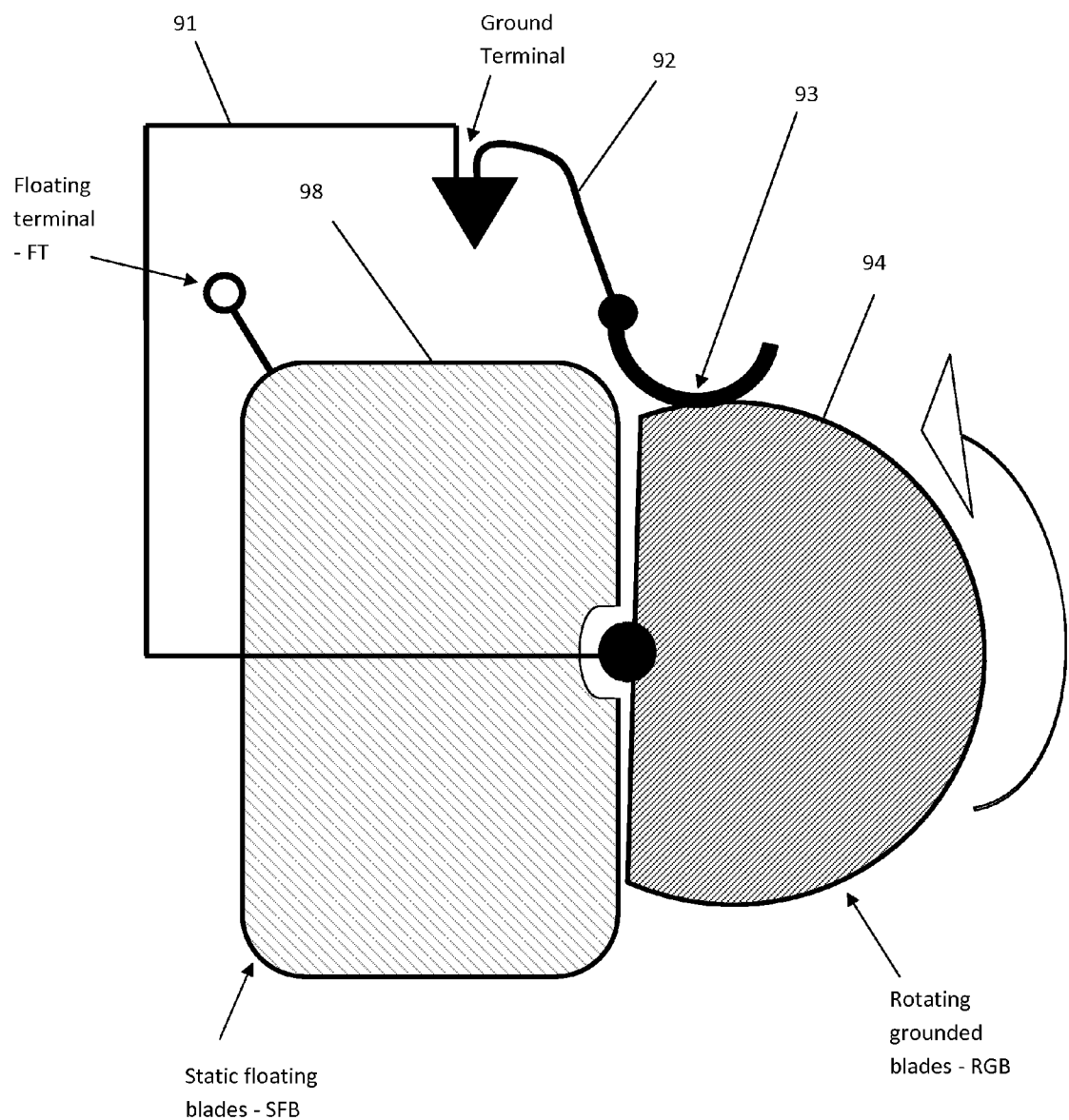
Figure 9: Concept of grounding a rotary blade capacitor in neutral (initialized) state

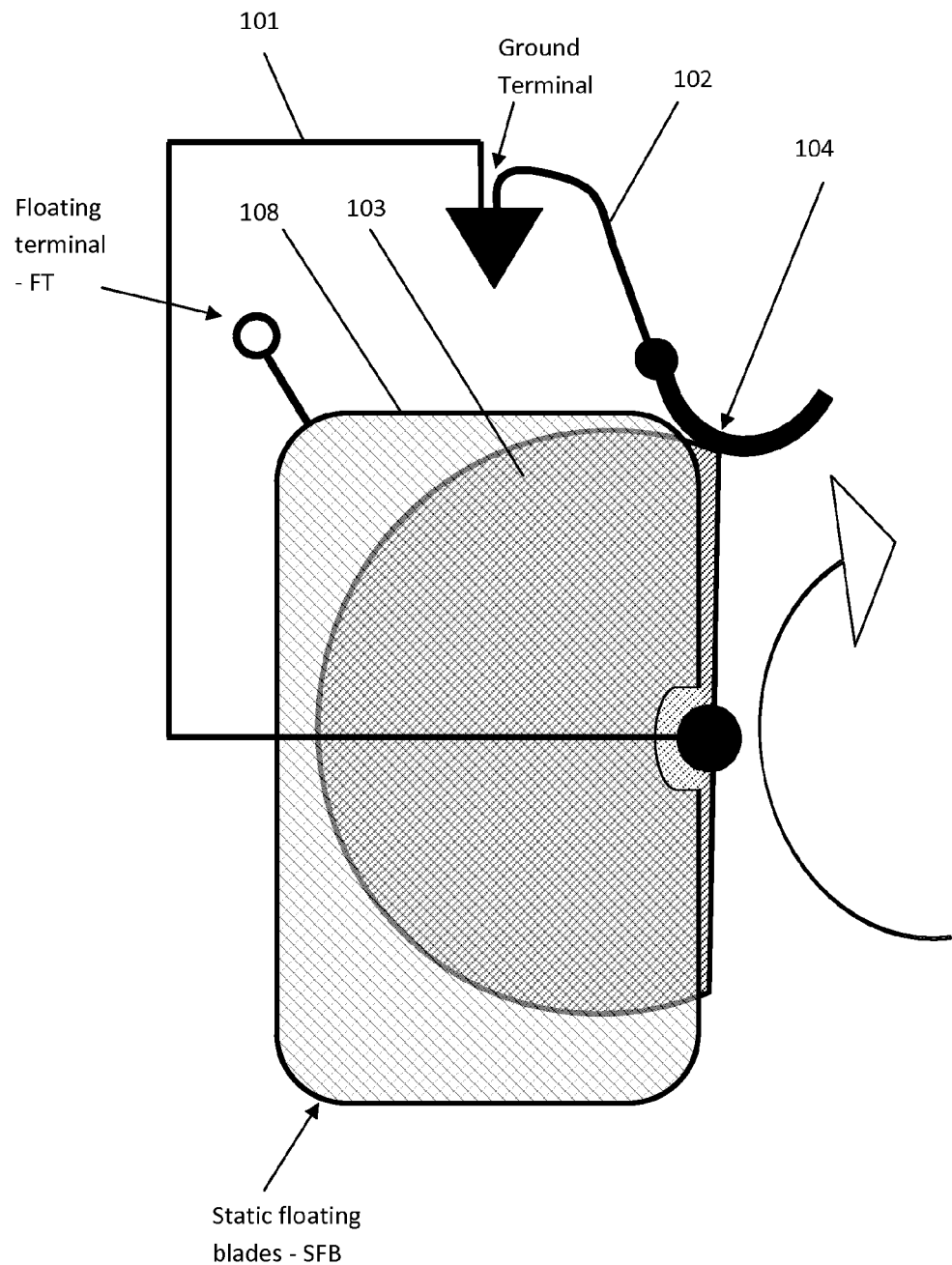
Figure 10: Concept of grounding a rotary blade capacitor in maximum capacitance state

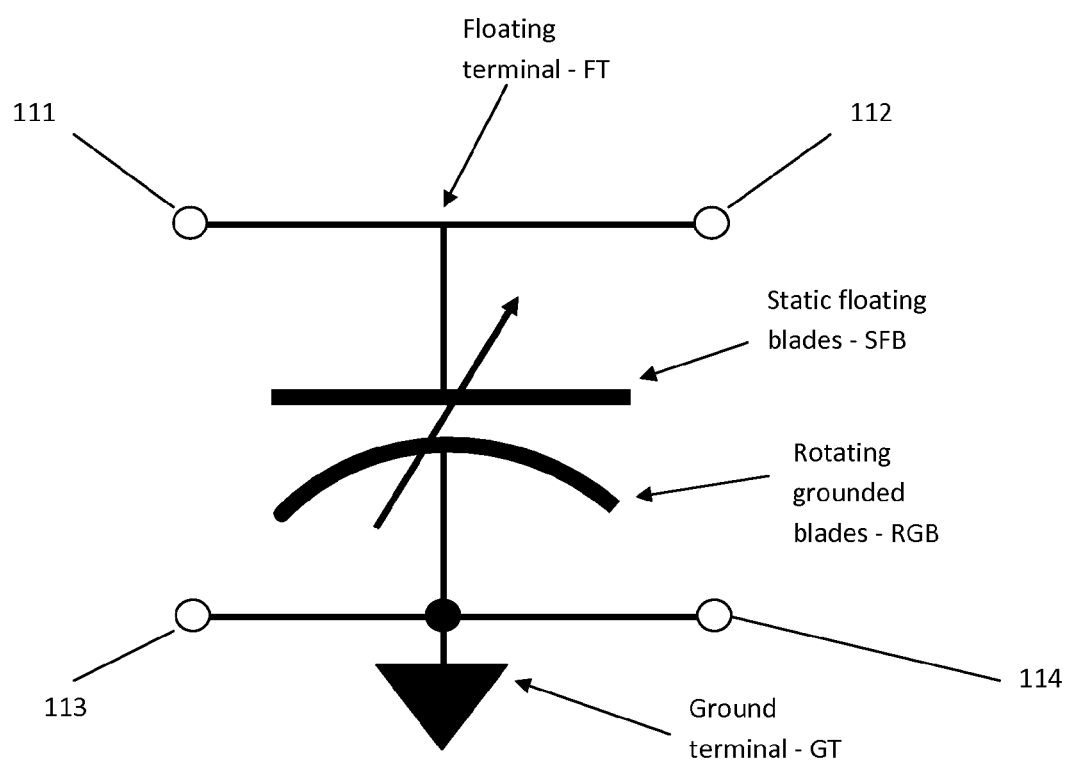
Figure 11: prior art, definition of static and rotating capacitor terminals

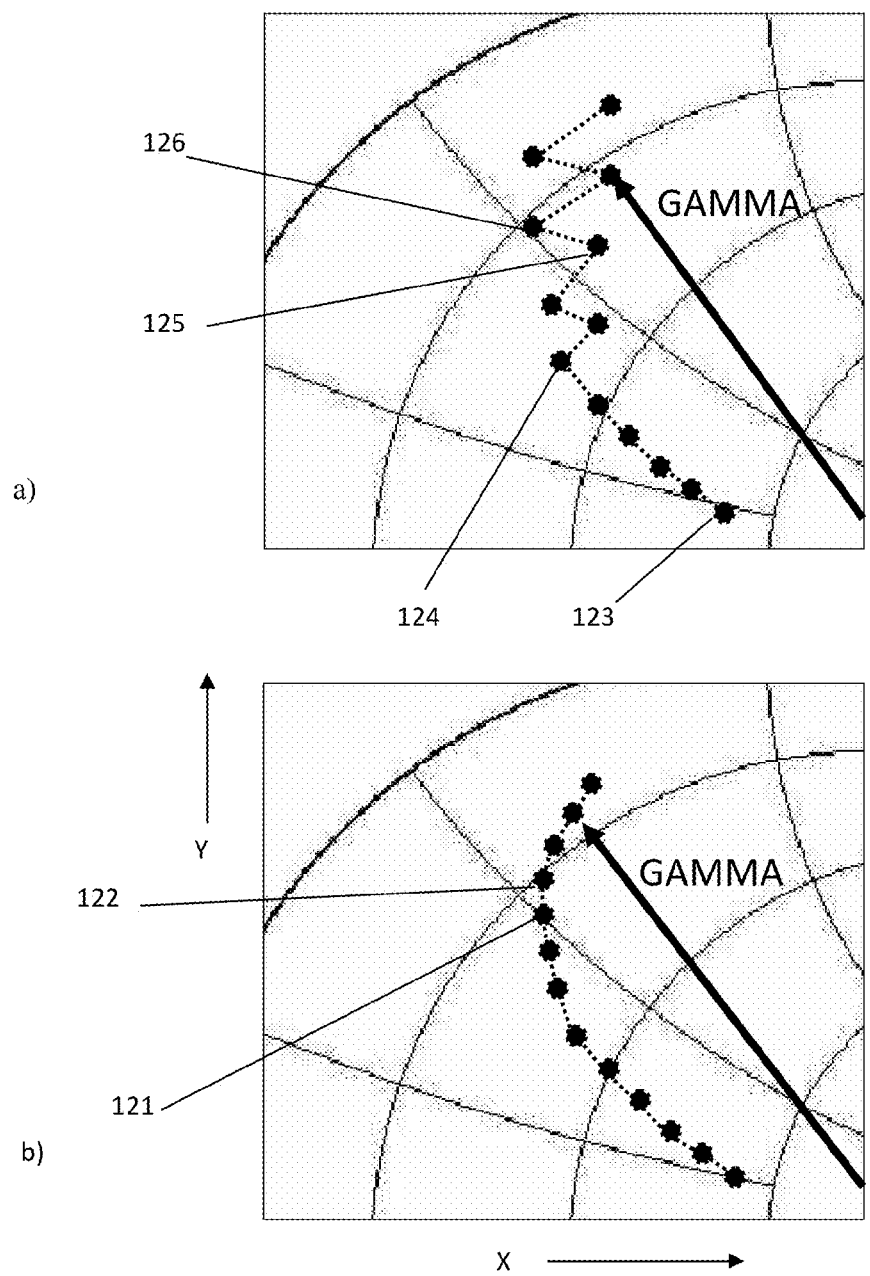
Figure 12: RF reflection factor for interpolation purposes; a) ungrounded, b) grounded

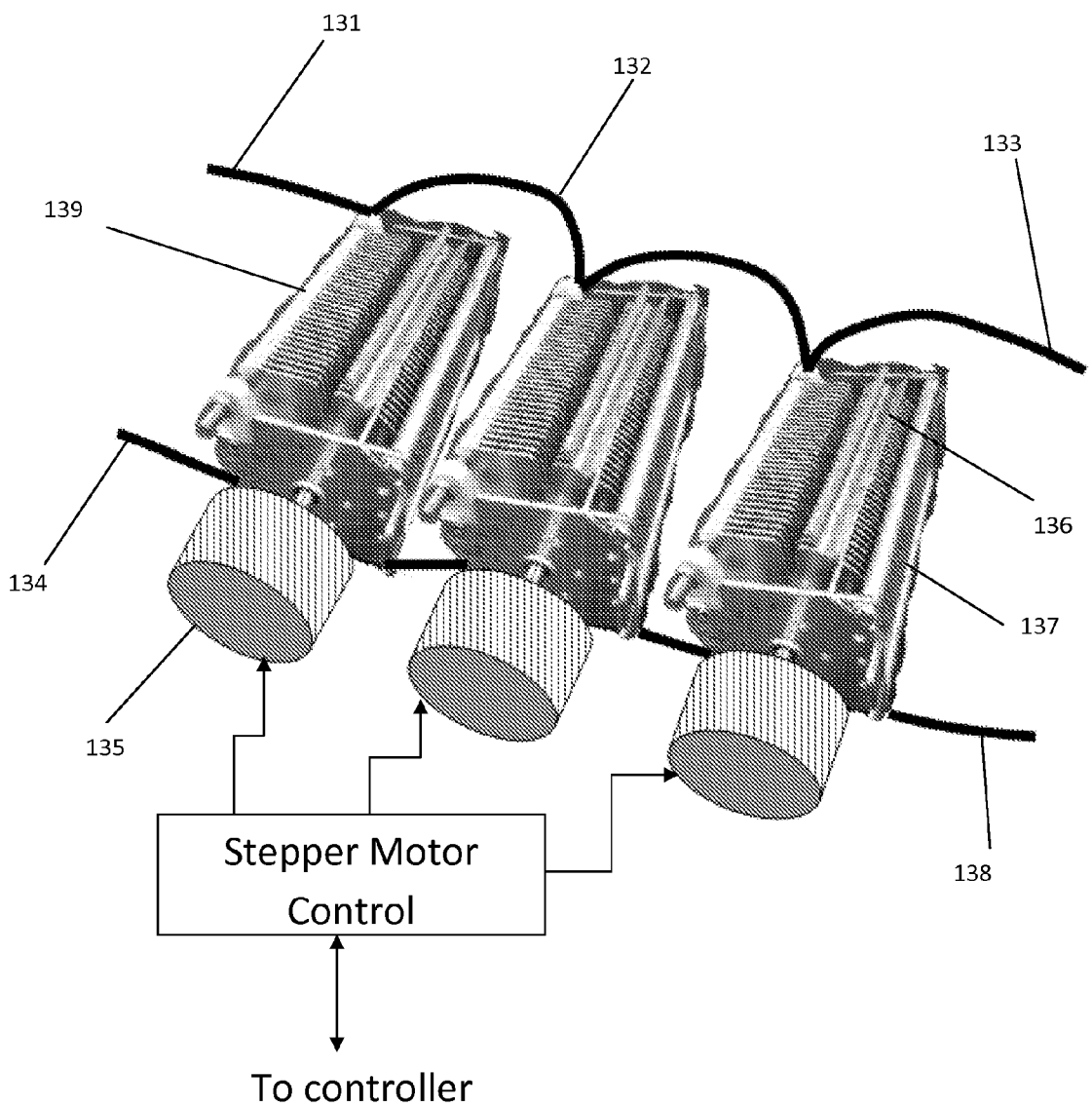
Figure 13: Impedance tuner using three grounded capacitors

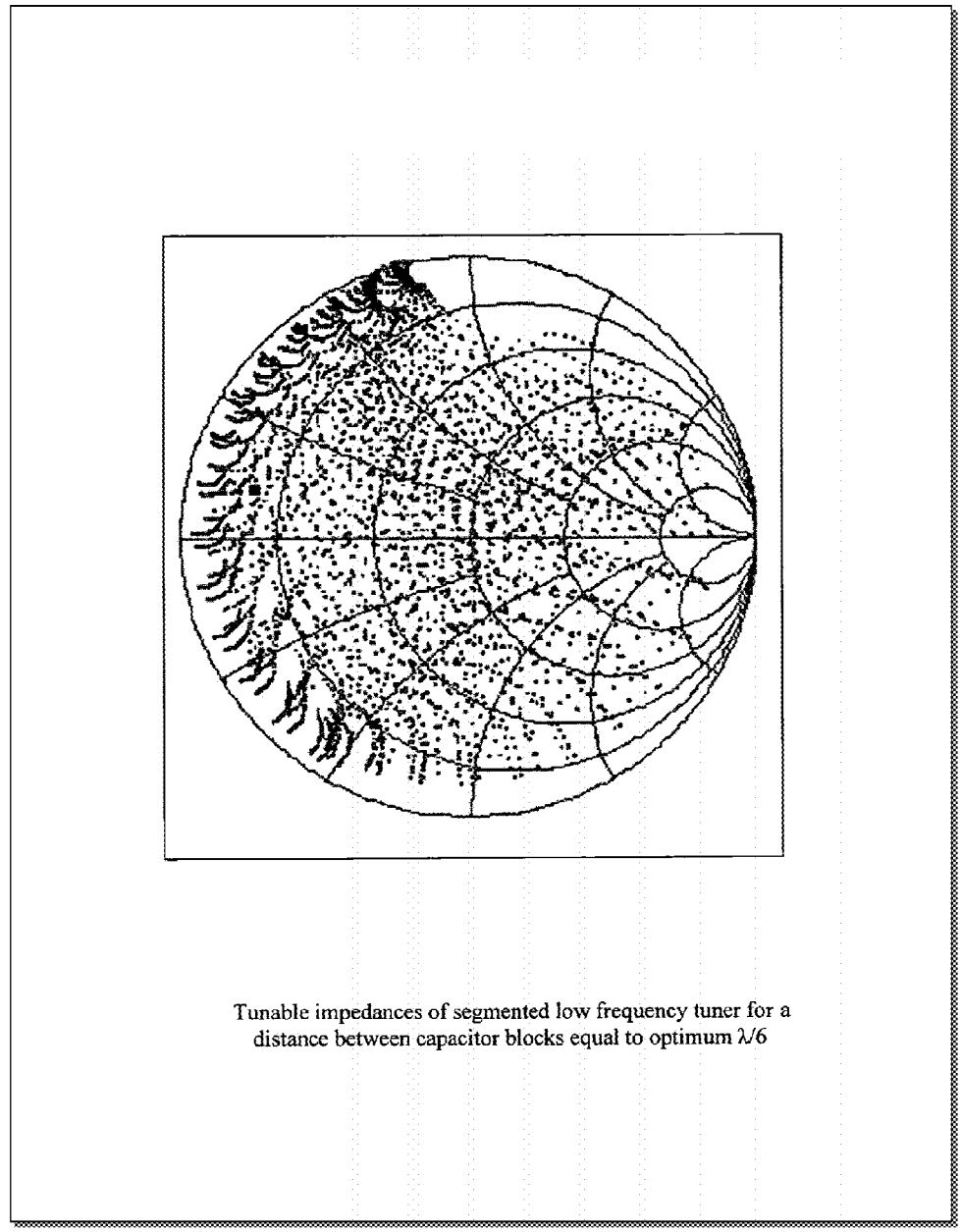
Figure 14 prior art: tuning coverage of three capacitor tuner

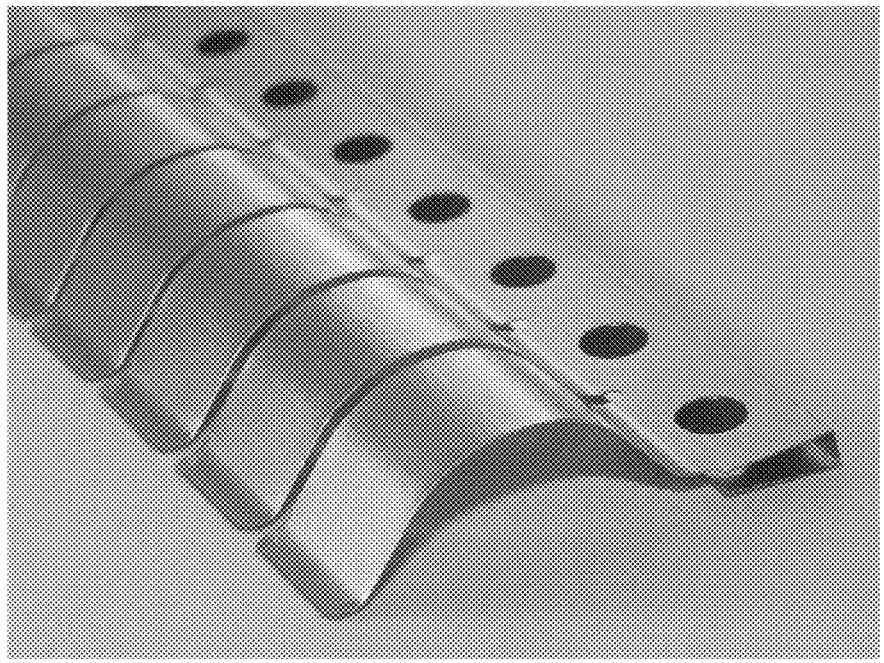
Figure 15: High deflection clip-on series contact (83, 93, 104) used for capacitor grounding [5]

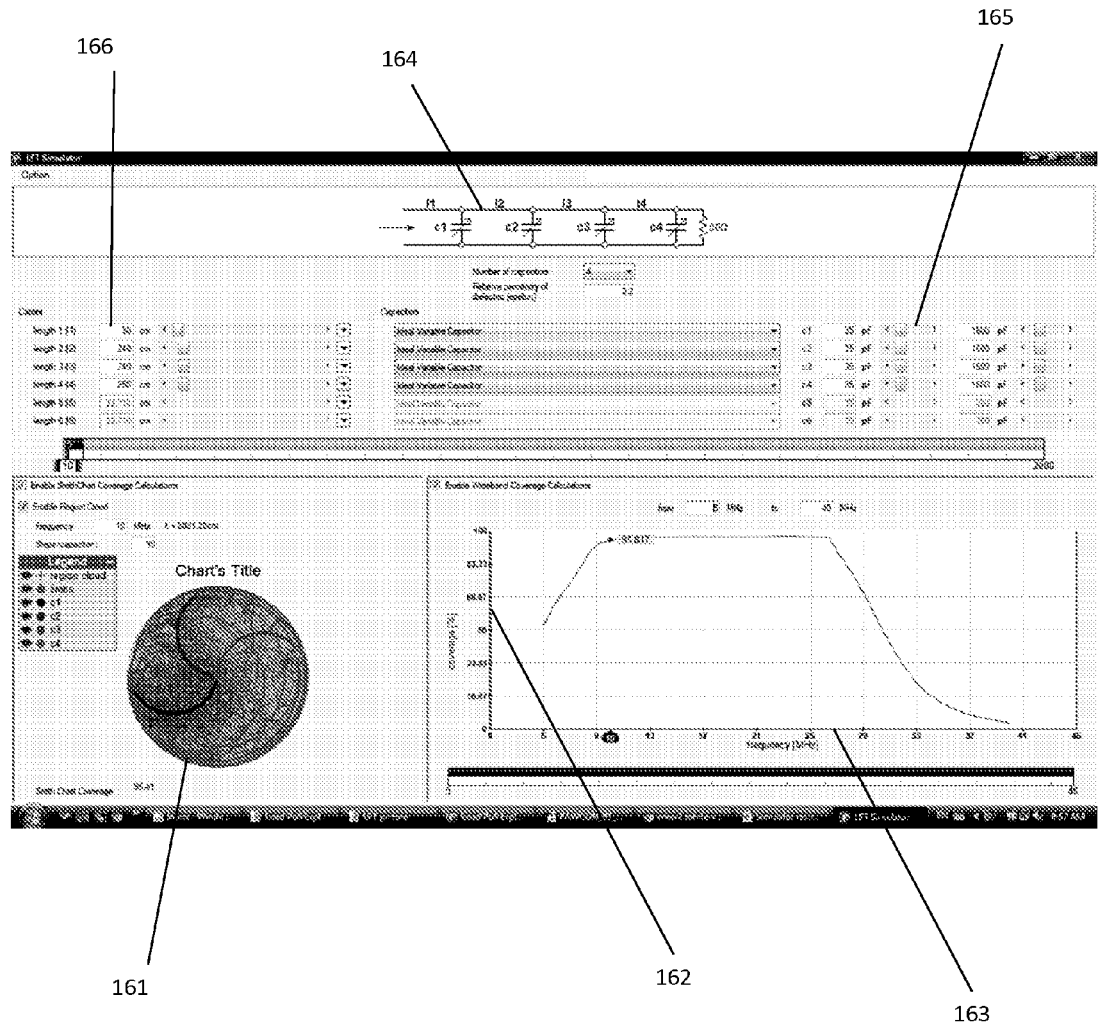
Figure 16: Optimizing tuner bandwidth and tuning range using a model

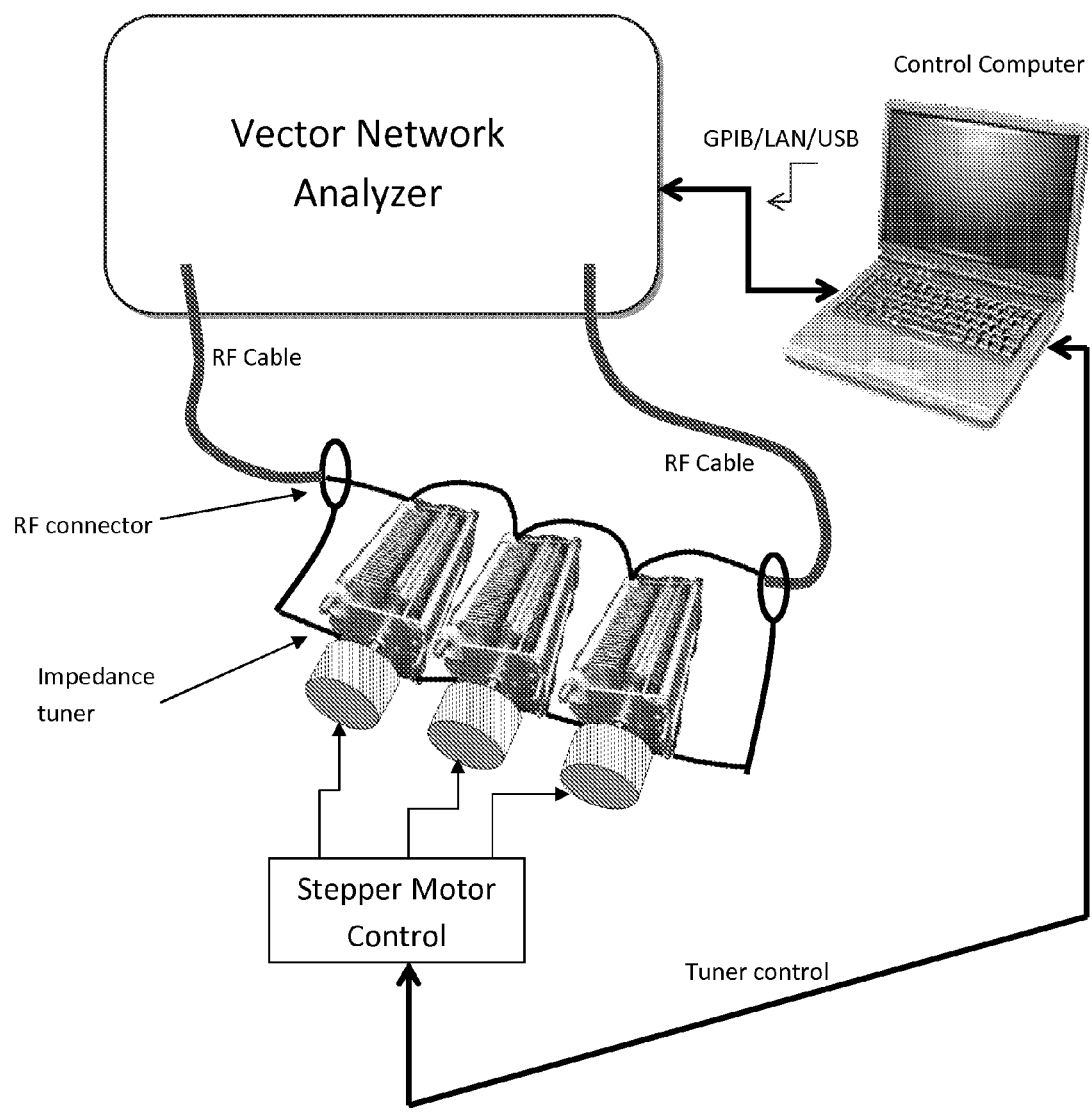
Figure 17: Setup for tuner calibration

MECHANICALLY CONTROLLED VARIABLE CAPACITORS FOR IMPEDANCE TUNERS

PRIORITY CLAIM

Not Applicable

CROSS-REFERENCE TO RELATED ARTICLES

[1] Load Pull System: http://www.microwaves101.com/encyclopedia/loadpull.cfm
[2] Computer Controlled Microwave Tuner—CCMT, Product Note 41, Focus Microwaves, January 1998
[3] U.S. Pat. No. 7,646,267 Low frequency electro-mechanical impedance tuner
[4] Rotary Capacitor—http://en.wikipedia.org/wiki/Variable_capacitor
[5] http:/omegashielding.com/category.php?id=75

BACKGROUND OF THE INVENTION

Prior Art

This invention relates to high power (nonlinear) testing of microwave transistors (DUT) in the frequency and time domain [1] using Load Pull. Load pull is the method by which the load impedance presented to the DUT at a given frequency is changed systematically and the DUT performance is registered, with the objective to find an optimum depending on the overall design objectives [1]. This may be maximum power, efficiency, linearity or else. The same is valid for the source side of the DUT. Passive (slide screw) tuners are used to emulate the various impedances presented to the DUT [2] for frequencies above 100 MHz, (FIG. 1). For frequencies between 10 MHz and approximately 200 MHz another type of tuner is used [3]. This latter tuner structure uses commercially available variable (rotary blade) capacitors and fixed lengths of coaxial cable (FIG. 1).

Rotary capacitors ([4], FIG. 2) are made using sets of parallel metallic blades (24, 25) which are isolated electrically (22) and are inserted into each other by rotating one of said sets (23); typically it is the rotating set (25) which is grounded (21) whereas the static set (24) is floating (FIG. 11). The grounding of the rotating set is made through the rotating axis (23) and the associated ball bearings and, occasionally, a sliding contact between the rotating axis (23) and the ground wall (21). This grounding technique is very economic, but, for RF purposes, unreliable. FIG. 3 shows an actual photograph of a typical rotary capacitor with a rotating axis (31) a ground wall (32) and the rotating grounded set of blades (33).

Impedance synthesis is a technique using tuner pre-calibration. The data, measured using a network analyzer, must be saved in computer memory and recalled to be used during the load pull measurement. Also, in order to increase the impedance point density, without unnecessarily increasing calibration time, interpolation methods are used to compute the capacitor's (and eventually the tuner's) behavior, in form of two-port S-parameters. In other words, the repeatability and mechanical to RF continuity of the capacitor's behavior is critical: if the capacitors are not repeatable or if the capacitance "jumps" when the capacitor axis is rotated, neither the calibration data can be re-produced, nor is it possible to apply interpolation techniques.

It has been found experimentally that the RF reflection factor created by capacitors as shown in FIG. 3 behaves erratically beyond a certain capacitance value (FIG. 4, areas (41, 42, 46)). In this area no repeatability or interpolation yield sufficient accuracy for the measurement system is possible; in addition such a capacitor shows a high residual reflection when in neutral state (44); the explanation to this, last, behavior is that, the ground connection (81) between the rotating axis (87) and the ground terminal is too long and too parasitic (FIG. 8).

This document discloses a method which allows said rotary capacitors to behave smoothly, predictably and repeatably.

BRIEF DESCRIPTION OF THE DRAWINGS

The invention and its mode of operation will be better understood from the following detailed description when read when read with the appended drawings in which:

FIG. 1 depicts prior art, the schematics of an impedance tuner using three variable shunt capacitors and lengths of cable connecting them in cascade.

FIG. 2 depicts prior art, the perspective view and basic definitions of the parts of a parallel blade rotary capacitor.

FIG. 3 depicts prior art, an actual photograph of a mechanically adjustable rotary capacitor.

FIG. 4 depicts prior art, the reflection factor of individual capacitors in a tuner assembly (as FIG. 1); the traces shown correspond to reflection factor measured as each capacitor is varied individually between the minimum and maximum value, whereas all other capacitors are set to their minimum value (neutral state).

FIG. 5 depicts the reflection factor of a four capacitor tuner, measured as in FIG. 4, whereby the capacitors have been modified using the improved grounding technique disclosed in this invention.

FIG. 6 depicts a photograph of a rotary capacitor having been modified with the improved grounding, showing all parts and the grounding contact.

FIG. 7 depicts a detail of FIG. 6, showing in particular the sliding ground contact.

FIG. 8 depicts a front view of the grounding assembly, the capacitor being in a medium capacitance setting.

FIG. 9 depicts a front view of the grounding assembly, the capacitor being in a minimum capacitance setting (neutral state).

FIG. 10 depicts a front view of the grounding assembly, the capacitor being in a maximum capacitance setting (blades fully overlapping).

FIG. 11 depicts prior art, the basic definitions of the rotary capacitor explained using an electrical equivalent circuit.

FIG. 12a) depicts prior art: measured reflection factor values for various capacitance settings of an un-grounded capacitor; FIG. 12b) depicts the same as in 12a) but for a grounded capacitor as disclosed in the present invention.

FIG. 13 depicts, schematically, a proposed three capacitor motorized and computer controlled tuner using grounded capacitors as in FIG. 6.

FIG. 14 depicts prior art, typical reflection factors measured for all calibrated capacitance permutations of a three capacitor tuner, when each capacitor is adjusted to values between minimum and maximum capacitance at a number of 20 steps (total number of points=$20^3$=8,000).

FIG. 15 depicts prior art, an example of sliding contact used to make the sliding ground for the rotary capacitors (item 62 in FIGS. 6 and 72 in FIG. 7).

FIG. 16 depicts a model and network calculation and optimization of impedance tuners using a cascade of a number of tuning sections, each section comprising a variable shunt capacitor and lengths of coaxial cable interconnecting with the other sections (164); the model is used to calculate the reflection factor response (161) of the tuner network and vary (optimize) the lengths of said cables (166) in order to reach maximum GAMMA coverage (162) over a required frequency range (163) using all possible permutations of capacitor settings; the capacitor values used in the model are entered in form of measured S-parameters of individual shunt capacitors measured as individual two-ports (FIG. 11) over said frequency range for a number of settings between minimum and maximum capacitance.

FIG. 17 depicts a tuner calibration setup, comprising the tuner two-port itself, connected using RF cables to a pre-calibrated vector network analyzer and a control computer; said control computer sets the tuner states by adjusting the stepper motors, and measures the tuner two-port S-parameters using the network analyzer, saves temporarily the data, makes all necessary calculations and matrix permutations and corrections and saves the data in calibration files.

DETAILED DESCRIPTION OF THE INVENTION

The invention discloses a method to create perfect grounding of the rotating set of blades in the rotary capacitor of FIG. 3. The concept is shown in FIGS. 8 to 10; in FIG. 8 the rotating set of blades (86) is partly engaged (84) with the static set (88); grounding of said rotating set if through the axis (87) and a long wire (81); this can be improved by introducing a sliding contact (83) directly connected with ground (82). The capacitance value increases when the rotating blades rotate in direction of the arrow (85). The sliding contact is important; the real embodiment is shown in FIGS. 6 and, in detail, 7. The commercially available material used to manufacture the sliding contact of a preferred embodiment is shown in FIG. 15.

In FIG. 6 the short connection to ground is shown (61) as well as the sliding contact, in form of a flexible bronze filament (62) formed and mounted such as to maintain contact with the rotating set of blades (63) at all times (FIGS. 9 and 10), even when said blades are fully engaged or not at all. In FIG. 6 is also shown the insulating mounting of the static set of blades (64, 65).

FIG. 5 shows the effect of improved grounding of the rotating comb-like set of blades; as is immediately visible the reflection factor at high capacitance values (FIG. 10) is smooth and continuous (51, 53, 54, 55). The residual reflection factor when the capacitance is in the neutral minimum, FIG. 9) state is also exactly at the center of the Smith chart (52) which means that the grounding also eliminates parasitic elements associated with the insufficient grounding of the unmodified capacitors (101), FIG. 10.

The grounding technique through the bronze filament (62) which extends over the entire width of the rotating set of blades (FIG. 6) adds an effective and self-polishing way of continuous grounding of each individual blade (72, 73). This sliding contact on the edge of each blade also eliminates any corrosion or dirt deposits that might surface during the operation. The short grounding wire (76) shown schematically also as (82) ensures perfect grounding for this MHz frequency range. For higher frequencies said wire (76) can easily be replaced by an even lower inductivity copper band.

The actual problem with the original capacitors occurs, as already mentioned before, when the capacitors move; in a static situation the capacitance created is sufficient; but when the tuner using said capacitors is calibrated and the calibration points are used to interpolate between capacitor settings (to increase the tuning resolution) then the discontinuity is not tolerable. This is shown in FIG. 12; FIG. 12 shows a zooming into the area (41) and (51) of FIGS. 4 and 5 respectively.

It is obvious to anybody basically versed in mathematical interpolations that, in the case of the un-modified capacitor (FIG. 12 a) interpolation beyond the calibration point (124) is quasi meaningless. Points (125) and (126) etc. cannot really be described using a polynomial or other simple mathematical relation. On the other hand points (121) and (122) etc. of the modified capacitor and the capacitor states between them can easily be described (as a function of the rotation of the set of blades) using simple linear relations in a Cartesian space, such as:

$X(i)=X(i-1)+\partial X/\partial i * \Delta i$; and $Y(i)=Y(i-1)+\partial Y/\partial i * \Delta i$; whereby "i" is be the number of the motor steps rotating the mobile blades of the capacitor (86), $X(i)$ and $Y(i)$ are the real and imaginary parts of the complex reflection factor $GAMMA(i)=X(i)+jY(i)$, shown on the Smith chart (FIG. 12 b) and $\partial X/\partial i$ and $\partial Y/\partial i$ the gradient of the real and imaginary part of said reflection factor as a function of the number of motor steps "i" with increasing overlapping (84) of the rotating mobile blades (85) with the static ones (88). $\partial X/\partial i$ and $\partial Y/\partial i$ can, in this case, easily be calculated from the linearly changing slope of the previous set of calibration points, such as shown in FIG. 12 b):

$\partial X/\partial i=(X(i)-X(i-k))/k$; $\partial Y/\partial i=(Y(i)-Y(i-k))/k$; whereby "k" is the number of motor steps between two successive calibration points (or capacitor settings) and $X(i)$ and $Y(i)$ are the measured values of real and imaginary parts of GAMMA (equal to the S-parameter S11 measured by the calibrated network analyzer used). The interpolation method is applied equally to the transmission factors $S21(i)=S12(i)$ and the output reflection factor $S22(i)$ using the same relations. The four S-parameters of each tuning capacitor section are necessary in order to be able to cascade the associated S-parameter matrices making up the tuner network.

The above described simple relations allow an accurate description of the RF behavior of the modified capacitors as shown in FIGS. 6 and 7 between calibration points, and yield, therefore, reliable and repeatable impedance synthesis (tuning) and load pull operations with tuning resolution higher than the calibrated points alone. The reduced number of calibration points is used in order to allow for a faster calibration procedure and is acceptable as long as (a) the reflection factor behaves smoothly (FIG. 12 b)) and (b) the interpolation method yields accurate results.

An impedance tuner using rotary capacitors and fixed lines of transmission cable [3] requires at least three tuning sections, each section having one variable capacitor and one section of coaxial cable, connecting to the next stage (FIG. 1); as can be seen from FIG. 4, if the reflection vectors of the tuning sections are arranged properly, the whole, or the largest part of the Smith chart can be covered by adjusting the amplitude of tuning vectors relative to each-other. When four tuning sections are used (FIG. 5) then an even better coverage is possible (FIG. 14, [3]).

A network simulation method and algorithm are used to optimize the length of interconnecting cables (166) for a selected set of capacitors, in order to maximize the tuning range on the Smith chart (161) and the continuous bandwidth coverage (163) of the multi-capacitor LC tuner (FIG. 16). In this algorithm the measured capacitance values are used as two-dimensional sets of S-parameters $S(i,f)$, whereby "i" is the motor steps (=angle of moving set of blades) and "f" is the frequency. Said S-parameter sets are measured between the input (111, 113) and output (112, 114) ports of the shunt capacitors, (FIG. 11), for minimum to maximum capacitance settings in a number of steps and as a function of frequency over the desired frequency range (165). The algorithm calculates all possible reflection factor permutations and displays a "coverage percentage number in [%]" (162), corresponding to the area of the unit circle (Smith chart) coverable (161) by the associated capacitances (165) and the combination of interconnecting coaxial cable lengths (164, 166). The algorithm then modifies the length of said cables in order to reach a maximum Smith chart coverage over the desired frequency range.

The benefit of the hereby disclosed capacitor grounding method lies in better accuracy and repeatability of the RF reflection factor, rather than a higher Smith chart coverage (tuning range), as is obvious from FIGS. 4 and 5. Such an impedance tuner is shown, schematically in FIG. 13; it comprises three grounded rotary capacitors (139), has an input port (131, 134), an output port (133, 138) and sections of coaxial cable (132) connecting in cascade the floating terminals of said capacitors. The capacitors are controlled by stepper motors (135), which are driven by an electronic circuit board and a data processor (controller resp. computer). Stepper motor control being obvious off-the-shelf material is not shown here in more detail. The three capacitors (139) of this tuner have all been modified using the hereby disclosed grounding technique, with the grounded bronze sliding contact (136), FIG. 15, applied on the rotating set of blades (137).

To be used in tuning operations and load pull measurements the tuners must be calibrated. Calibration consists of connecting said tuners to pre-calibrated network analyzers using high quality RF cables and measure the tuner two-port's S-parameters for various capacitor settings (FIG. 17). There are two possibilities (a) the direct method and (b) the de-embedding method;

The direct method consists of calibrating all N possible permutations of capacitor settings wherein $N=A^M$, whereby A is the number of capacitor settings (typically 10 to 20) and M is the number of tuning sections (capacitors), typically 3, 4 or 5; i.e. a three capacitor tuner (M=3) calibrated at A=10 capacitor settings would have to be calibrated at 1,000 points; a four capacitor tuner (M=4) calibrated at A=20 capacitor settings would have to be calibrated at 160,000 points. This example shows the limits of the direct method.

The de-embedding tuner calibration method consists of calibrating the tuner at a number of states N=A*M, whereby A and M are as defined before. In this case the first tuner (3 stages at 10 settings per stage) needs to be calibrated at 30 capacitor settings (instead of 1,000) and the second one (4 stages at 20 settings each) at 80 capacitor settings (instead of 160,000); the required data for 1,000 respectively 160,000 sets of S-parameters are then generated very rapidly in computer memory by cascading the measured sets of S-parameters. This is far more efficient than time consuming measuring of thousands of points. For the de-embedding calibration to work, the measured S-parameters of all tuning sections, except for the first section, must be de-embedded (multiplied with the inverse matrix) by the S-parameter matrix of the "neutral" tuner two-port, measured when all capacitors are in the neutral state (minimum capacitance, FIG. 9).

Obvious alternative grounding methods and interpolation algorithms, including modified components, of the above method are imaginable but shall not impede on the validity and general coverage of the claims of the hereby described concept of improving the RF behavior and tuning continuity of rotary capacitors using a sliding ground filament making sliding contact with and grounding the rotating capacitor blades.

What I claim is:

1. A method for improving the RF behavior and tuning continuity of mechanically adjustable rotary capacitors, said capacitors comprising a static set of comb-like parallel metallic blades, and a mobile set of comb-like parallel metallic blades, said sets of blades being able to overlap each-other inter-digitally, without making galvanic contact, by rotating said mobile set of blades to adjust the overlapping area, said mobile set of blades being grounded and said static set of blades being insulated from ground (floating), and a conductive sliding contact connected between the edges of the rotating mobile blades and ground.

2. A method as in claim 1, whereby said conductive sliding contact is connected to the ground terminal using a short, low parasitic conductive lead.

3. A method as in claim 1, whereby said conductive sliding contact is formed in such a way as to maintain sliding contact with the rotating set of metallic blades under all possible rotation angles, from a state of full overlapping (maximum capacitance) to a state of no overlapping (minimum capacitance).

4. A method as in claim 1, whereby said adjustable capacitors are used in making an impedance tuner, said tuner comprising at least three rotating capacitors connected in shunt configuration, whereby the floating terminals of said capacitors are connected in cascade to each-other using lengths of coaxial cable, and whereby the grounded terminals are connected to the common ground.

5. A tuner as in claim 4, whereby the lengths of said interconnecting cable are optimized using a network simulation and optimization software algorithm in order to create high reflection over a maximum frequency range, said algorithm calculating the reflection factor of a cascade of variable shunt capacitors (FIG. 11) interconnected using variable lengths of coaxial cable, as a function of capacitance value and frequency, whereby said capacitors are represented by sets of measured S-parameters for a number of capacitance settings between the minimum and maximum values, and whereby the lengths of interconnecting cables are varied in order to reach a maximum Smith chart coverage for all permutations of capacitance values.

6. A calibration method for a tuner as in claim 5, whereby the tuner two-port S-parameters are measured at a given frequency using a pre-calibrated vector network analyzer for a number of settings of each capacitor, between the minimum and maximum capacitance value and for all possible permutations of capacitor settings of all capacitors, and whereby all sets of S-parameters and associated capacitor settings are saved in a tuner calibration file ready for retrieval.

7. A calibration method for a tuner as in claim 5, whereby the tuner two-port S-parameters are measured at a given frequency using a pre-calibrated vector network analyzer as follows:

a) measure two-port S-parameters matrices for a number of settings of each capacitor "i" (i=1,2,3 . . . ) individually, between the minimum and maximum capacitance value, all other capacitors being set to their minimum capacitance setting (neutral state), and save in file $\{Si\}$, b) measure the S-parameter matrix of the tuner two-port with all capacitors in their neutral state and save in file $\{S0\}$, c) de-embed all S-parameter matrices $\{Si\}$, for i>1, by cascading with the inverse matrix $\{S0\}^{-1}$, d) cascade numerically in computer memory S-parameters of all permutations of all capacitor settings of all matrices {Si} and save in a tuner calibration file ready for retrieval.

8. An interpolation algorithm for calculating the S-parameters of calibrated tuners as in claim 7, for any capacitor setting between calibrated points, as follows:

a) calculate the sets of S-parameters (Smn, {m,n}={1,2}) of each tuning section "i" (i=1,2,3 . . . ) between two successive calibrated capacitor settings (k, k+1) using linear interpolation for the real and imaginary part of each set of S-parameters Smn(k) and Smn(k+1), whereby k is the index of the calibrated point 1,2,3,4 . . . A, and A is the number of capacitor settings used in the calibration, b) cascade the interpolated S-parameter matrices of all tuning sections numerically.

\* \* \* \* \*